United States Patent [19]

Kuc

[11] 4,289,317

[45] Sep. 15, 1981

[54] PUMP SHAFT CLOSURE

[75] Inventor: Henry Kuc, Los Angeles, Calif.

[73] Assignee: Peerless Pump Division, Indian Head, Inc., Montebello, Calif.

[21] Appl. No.: 60,795

[22] Filed: Jul. 25, 1979

[51] Int. Cl.³ .................... F16J 15/18; F16K 1/00
[52] U.S. Cl. ............................ 277/1; 277/9; 277/115; 277/117; 251/330; 251/334; 251/340
[58] Field of Search .............. 277/9, 104, 105, 112, 277/115, 116, 116.2, 117, 118, 130–132, 190, 191, 1; 251/330, 334, 340

[56] References Cited

U.S. PATENT DOCUMENTS

| 128,906 | 7/1872 | Reed | 277/116 |
|---|---|---|---|
| 230,080 | 7/1880 | Stewart | 277/9 |
| 672,238 | 4/1901 | Philp | 277/116 |
| 706,976 | 8/1902 | Macindoe | 277/104 |
| 884,864 | 4/1908 | Salt et al. | |
| 1,028,758 | 6/1912 | Mason et al. | |
| 2,266,935 | 12/1941 | Stephens et al. | |
| 2,340,016 | 1/1944 | Pruiett | |
| 2,564,912 | 8/1951 | McKissick | 277/115 X |
| 2,655,391 | 10/1953 | Atkins | 277/105 X |
| 2,853,321 | 9/1958 | Davey | |
| 2,876,708 | 3/1959 | Frost | 277/117 X |
| 3,119,624 | 1/1964 | Freed | 277/115 |
| 3,578,342 | 5/1971 | Satterthwaite et al. | 277/9 |
| 3,675,933 | 7/1972 | Nappe | 277/9 |

FOREIGN PATENT DOCUMENTS

| 402081 | 1/1912 | France | 277/117 |
|---|---|---|---|
| 218641 | 10/1924 | United Kingdom . | |
| 441732 | 1/1936 | United Kingdom . | |
| 499603 | 1/1939 | United Kingdom | 277/112 |
| 605877 | 8/1948 | United Kingdom . | |
| 607569 | 9/1948 | United Kingdom . | |
| 738055 | 10/1955 | United Kingdom . | |
| 875227 | 8/1961 | United Kingdom . | |

*Primary Examiner*—Robert S. Ward, Jr.
*Attorney, Agent, or Firm*—Lyon and Lyon

[57] ABSTRACT

An improved stuffing box can effect an auxilliary static seal with a moveable shaft to allow replacement of packing elements. The stuffing box includes a sealing ring concentrically disposed around the shaft and means for mounting the sealing ring radially spaced apart from the shaft to permit lubricating fluid to flow between the sealing ring and the shaft during movement of the shaft. The stuffing box also includes a seal container axially moveable along the shaft for pressing the sealing ring radially against the shaft to form the static seal.

11 Claims, 3 Drawing Figures

PUMP SHAFT CLOSURE

BACKGROUND

This invention relates to a device which enables the user to replace sealing elements of a shaft seal used for a pump or the like without the danger of the fluid being pumped leaking to the atmosphere.

When a pump is shut down for repacking or repairs of the shaft seal, it is necessary to provide auxiliary sealing means around the shaft so when the packing is removed, fluid is not released to the atmosphere. Prior art devices are available for this purpose. For example, in U.S. Pat. No. 1,028,758 issued to Mason and Hammond, there is described a stuffing box for reciprocating shafts in oil wells. The stuffing box includes packing rings which can be brought into engagement against the shaft. Davey in U.S. Pat. No. 2,853,321 describes a stuffing box incorporating means for effecting and maintaining a fluid-type seal during replacement of packing elements in the stuffing box. The means includes a tubular stuffing box concentric with a pump shaft, and a sleeve axially shiftably disposed over the shaft within the stuffing box. By axially shifting the sleeve relative to the stuffing box, it is possible to selectively establish and disestablish an axial fluid seal between the sleeve and a flange of the stuffing box.

Although both of these prior art arrangements can be effective for maintaining a fluid tight seal during replacement of packing elements around a shaft, there are many problem applications for which they are unsuitable. One such application is a pump for geothermal wells. Pumps for geothermal applications are usually rotary pumps, having a shaft extending from above ground to depths of 500 to 1500 feet. The hot water in geothermal wells is corrosive, can be under high pressure, contains solid impurities, and by thermal expansion can cause the shaft to increase in length relative to the column pipe by as much as four inches. Because of these unique problems associated with applications such as geothermal wells, conventional devices for replacement of packing elements, including those of Mason et al and Davey, are unsatisfactory.

In particular, the device of Mason et al is unsatisfactory because the pressure of the water in the well acts to press the compression packing ring against the shaft during operation. This is not a problem for some applications with only low pressure at the stuffing box such as for reciprocating shafts in oil wells, but it is a serious problem for rotary shafts in geothermal water wells. The Mason et al device is particularly unsatisfactory where a portion of the fluid being pumped is permitted to flow in the clearance between the shaft and a seal ring to cool and lubricate the shaft seal. If the device of Mason et al were used in such an application, the compression packing ring could block the flow of the fluid, resulting in rapid wear of the shaft.

The device of Davey does not work in geothermal applications because of the difference between the thermal expansion of the shaft and that of the column pipe. To accommodate that difference in linear thermal expansion, four inches of clearance are provided in the pump. Therefore, it would be necessary to move the Davey sleeve at least four inches to obtain an axial seal. Such a great amount of axial movement is impractical. This is particularly true because of the hostile nature of geothermal brines which within a very short time can deposit so much scale and so corrode the sleeve and the shaft, that axial movement is impossible.

In view of these problems, there is a need for a reliable and simple stuffing box assembly for forming a static seal around a moveable shaft, and particularly a rotating shaft used in geothermal wells.

SUMMARY

The present invention is directed to a stuffing box assembly with the above features. The stuffing box assembly comprises sealing means concentrically disposed around the shaft and means for mounting the sealing means radially spaced apart from the shaft so that fluid flowing along the shaft can act to force the sealing means away from the shaft. In order to establish a static seal around the shaft, a seal container axially moveable along the shaft is provided. The seal container is controllably displaced axially relative to the shaft for selectively (a) pressing the sealing means against the shaft for replacement of packing elements or (b) allowing the sealing means to be spaced apart from the shaft during movement of the shaft.

DRAWINGS

These and other features, aspects, and advantages of the present invention will become better understood with reference to the following description, appended claims, and accompanying drawings where:

FIG. 3 shows in vertical cross-section the stuffing box assembly of FIG. 2 where a static seal is being maintained.

DESCRIPTION

The present invention is directed to an improved stuffing box assembly for moveable shafts. Although the stuffing box assembly is particularly useful for rotating shafts for deep well geothermal pumps, it can be used for other rotary and reciprocating pumps. Also it can be used for fluid handling machinery other than pumps in geothermal well applications, including pumps used for oil wells, water wells, chemical processing, mixers, and the like.

Figure 1:
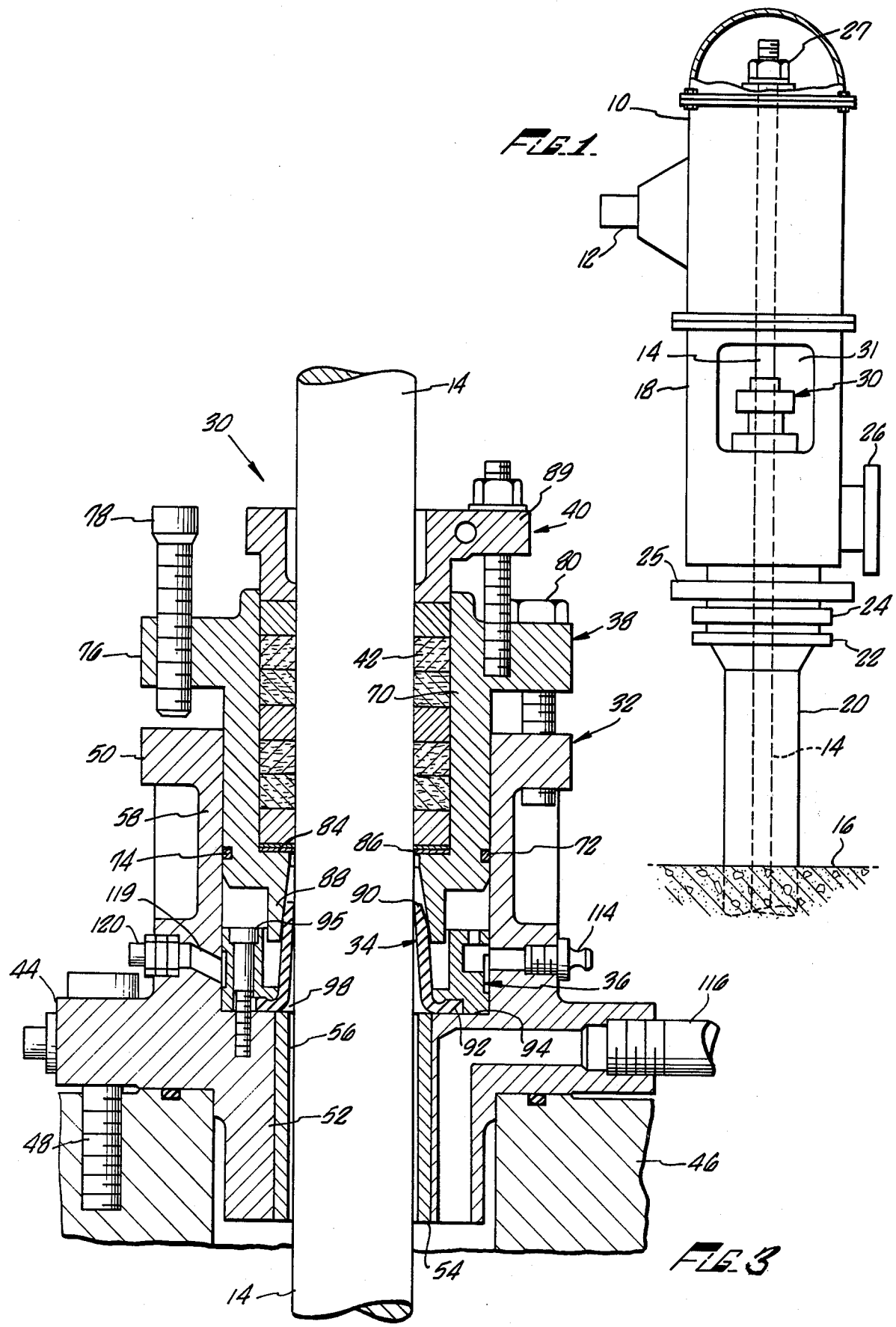
FIG. 1 shows the gear drive and discharge head of a vertical lineshaft pump in a geothermal well, the shaft of the pump being provided with a stuffing box assembly according to the present invention.

With reference to FIG. 1, there is shown the above ground portion of a deep well geothermal line shaft pump. Included is a power drive 10 having a laterally extending shaft 12 which in use is connected to a rotary power source (not shown). A vertically extending rotatable shaft 14 extends all the way down to the submerged pump, which can be as far down as 1500 feet below ground level 16. The gear drive 10 is mounted on a discharge head 18 which in turn is supported by a well head 20. An upper flange 22 of the well head 20, column pipe top flange 24, and a discharge head base 25 are secured together. The discharge head 18 includes a laterally extending duct 26 through which water pumped from the well is discharged. The top of the shaft is threaded and is provided with an adjustable nut 27 that allows the shaft 14 to move up and down in the well by as much as 4 inches.

A stuffing box assembly 30 having features of the present invention is mounted around the shaft 14 and an access opening 31 is provided through the discharge head to the stuffing box assembly.

When the term "axial" is used herein, reference is made to the longitudinal axis of the shaft 14. When the term "radial" is used herein, reference is being made to a direction that is radial with respect to the shaft 14.

Figure 2:
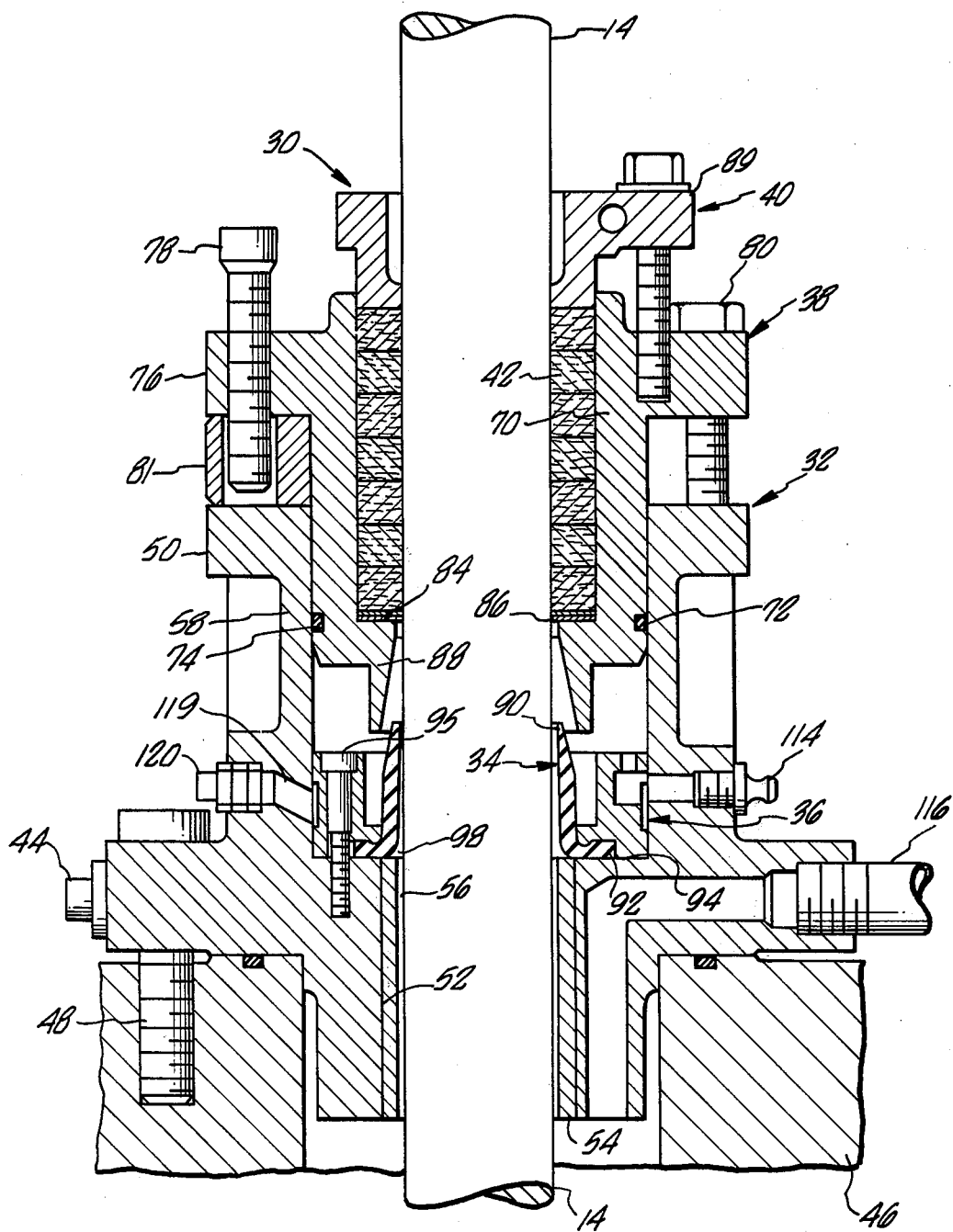
FIG. 2 shows in vertical section the details of the stuffing box assembly of the pump of FIG. 1, where a static seal is not being maintained against the shaft.

With reference to FIGS. 2 and 3, the main components of the stuffing box assembly are a housing 32, a seal ring 34, a seal ring retainer 36, packing container 38, a packing gland 40, and packing 42. The housing 32 is concentrically mounted around the shaft 14. The housing includes two radially extending flanges, a mounting flange 44 secured to the housing 46 of the pump by means of a plurality of bolts 48 and a support flange 50 at the end of the housing distal from the pump. The portion 52 of the housing 32 between the mounting flange 44 and the pump is only slightly spaced apart from the shaft 14. Sufficient room is provided therein for a bronze throttle bushing 54 and an annular clearance 56 between the throttle bushing 54 and the shaft 14 for flow of lubricating fluid.

The remaining portion 58 of the housing is further spaced apart from the shaft 14 than is the portion 52 near the pump housing. Sufficient room is provided therein to house the seal ring 34, the seal ring retainer 36, and the packing container 38 with the packing 42.

The packing container 38 is concentrically disposed around the shaft 14. It includes a tubular body portion 70, the outer diameter of which is about equal to the inner diameter of the upper portion 58 of the housing so that the packing container can slide axially within the housing in sealing relationship thereto. The tubular body portion 70 has a small annular recess 72 in its outer wall in which is mounted on O-ring 74 to provide a fluid tight seal between the packing container 38 and the housing 32.

The packing container 38 includes a radially extending flange 76 in mating relationship to the support flange 50 of the housing. These two flanges are maintained axially spaced apart at a selected distance by jackscrews 78 extending through the flange 76 of the seal container and supported by the support flange 50 of the housing 32. After the selected distance is set, the two flanges are secured together by a plurality of cap screws 80. As shown in FIG. 2, a removable spacer 81 can be placed around each jack screw 78 between the two flanges 76 and 50 to assure satisfactory alignment during operation at the pump. The portion of the packing container in the housing includes (a) a shoulder 84 which supports washers 86 and the packing 42 and and (b) proximate to the sealing ring 34 a truncated conically shaped skirt 88 flaring away from the shaft 14. The packing gland 40 holds the packing 42 within the container 38. A radially extending flange 89 of the gland is bolted to the support flanges 38 of the housing.

The sealing ring 34 includes an axially extending main portion 90 and a radially extending flange 92. The flange portion 92 is held against an internal shoulder 94 of the housing by the seal ring retainer 36 and a plurality of retainer screws 95 mounted through the seal ring retainer 36 into the shoulder 94. With this mounting, the main portion 90 of the sealing ring 34 is free to move radially relative to the shaft 14.

In FIG. 2, the sealing ring 34 is shown in its idle or open position. This is during normal pump operation when the pump is pumping fluid up through the discharge conduit 26. During this normal operation, the conical skirt 88 of the packing container 38 is fully disengaged from the main portion 90 of the seal ring 34 to allow the fluid being pumped to flow through the clearance 56 between the throttle bushing and the shaft and the clearance 98 between the seal ring 34 and the shaft. Flow of the fluid is needed to cool and lubricate the stuffing box assembly.

When the pump is shut down for repacking or repairs of the shaft seal, the seal container 38 is moved axially until the clearance between the seal ring 34 and the shaft 14 is closed. This is accomplished by undoing the jackscrews 78 and screwing down the cap screws 80. The axial movement of the seal container 38 results in the skirt 88 exerting a radially inward force on the main portion 90 of the sealing ring 34. This compresses the resilient seal ring against the shaft and closes the clearance 98. The packing 42 can now be removed without danger of fluid being released into the atmosphere. This configuration of the stuffing box assembly of the present invention is shown in FIG. 3.

To provide additional lubricant to the stuffing box assembly and protection from corrosion, a grease fitting inlet 114 is provided through the housing. In addition, a water flush inlet 116 is also provided through the housing so that any solids carried into the stuffing box can be flushed out through a by-pass hole 119 in the housing wall. This hole is normally closed with a pipe plug 120.

The stuffing box assembly of the present invention has many advantages over prior art devices. It simply, safely, reliably, and inexpensively provides a static seal for the shaft 14 when packing 42 is replaced. The high pressure and constant flow of lubricating fluid in the clearance 98 between the seal ring 34 and the shaft 14 insures that deposits of solids and corrosion cannot build up in this region. Furthermore, the pressure of the fluid acts to maintain the seal ring spaced apart from the shaft. This is unlike the prior art device described in U.S. Pat. No. 1,028,758 where the pressure of fluid acts to force the packing ring against the shaft.

Another advantage of the present invention is that only a small amount of axial movement of the seal container 38, in the order of about 0.75 inches, is required to radially force the sealing ring 34 against the shaft. Such a small amount of axial movement is easily attained, and corrosion preventing such axial movement is not a problem. This is unlike the prior art device described in U.S. Pat. No. 2,853,321, where for deep well geothermal pumps, at least four inches of axial movement are required, and corrosion can prevent the required axial movement.

To insure that the sealing ring returns to its open position, especially after long service, the pipe plug 120 can be removed to open the by-pass hole 119 for fluid flowing through the clearance 56 between the throttle bushing and the shaft. This increases the pressure differential across on the sealing ring and in turn increases the clearance between the sealing ring and the shaft.

The sealing ring can be made of any resilient, durable material, including metals. It has been found that satisfactory seal rings can be made of EPDM rubber (ethylene propylene rubber).

Although the present invention has been described in considerable detail with reference to certain versions thereof, other versions are possible. For example, the shaft need not be oriented vertically, but is can be oriented longitudinally or transversely to the vertical. Therefore, the spirit and scope of the appended should not necessarily be limited to the description of the versions contained herein.

What is claimed is:

1. In an apparatus for pumping a fluid comprising a movable shaft, packing, and means for holding the packing against the shaft, the improvement comprising means for forming a static seal around the movable shaft comprising sealing means having opposing ends, the sealing means being concentrically disposed around the shaft, means for securely mounting the sealing means radially spaced apart from the shaft so that the fluid can flow between the sealing means and the shaft and can force the sealing means away from the shaft when the shaft is moving, the sealing means being mounted adjacent its end closer to the fluid being pumped, and means axially movable along the shaft for pressing the sealing means radially against the shaft when the shaft is stationary, thereby forming a static seal around the shaft so that the packing can be removed without fluid leakage.

2. The apparatus of claim 1 in which the sealing means is a sealing ring having a radially extending flange.

3. The apparatus of claim 2 in which the means for mounting comprises a housing against which the flange is securely held by retaining means.

4. The apparatus of claim 1 in which the axially moveable means includes a truncated conical skirt concentrically disposed relative to the shaft for pressing the sealing means radially against the shaft.

5. The apparatus of claim 1 in which the shaft is rotatable.

6. The apparatus of claim 5 in which the shaft is at least 500 feet long and is suitable for use in a geothermal well.

7. A stuffing box assembly for a rotatable shaft used to drive a fluid pump, the stuffing box assembly being capable of forming a static seal against the shaft for replacement of packing elements, the assembly comprising:
 (a) a housing concentrically disposed around the shaft;
 (b) packing means for holding the packing against the shaft;
 (c) a resilient sealing ring having opposing ends, the ring being within said housing and concentrically disposed around the shaft, the ring comprising an axially extending main portion and a radially extending flange, the flange being at the end of the sealing ring proximate to the fluid;
 (d) retaining means for securely holding the flange against the housing so that in the absence of a radially inwardly directed force the main portion of the sealing ring is radially spaced apart from the shaft so that fluid can pass axially along the shaft and act to force the sealing ring radially away from the shaft;
 (e) a seal container secured to the housing and axially moveable relative to the housing, the shaft, and the sealing ring; and
 (f) means for controllably displacing the seal container axially relative to the shaft for selectively (i) pressing the main portion of the sealing ring radially inwardly against the shaft for forming a static seal around the shaft when the shaft is not rotating or (ii) allowing the sealing ring to be spaced apart from the shaft when the shaft is rotating.

8. The apparatus of claim 7 wherein a portion of the seal container is concentrically disposed within the housing in sealing relationship thereto.

9. A method for removing the packing from an apparatus used for pumping a fluid comprising a removable shaft, packing held against the shaft, and means for forming a static seal around the movable shaft comprising (i) sealing means having opposing ends and concentrically disposed around the shaft, (ii) means for mounting the sealing means radially spaced apart from the shaft so that fluid can flow between the sealing means and the shaft and can force the sealing means away from the shaft, the sealing means being mounted adjacent its end closer to the fluid being pumped, and (iii) pressing means axiaally movable along the shaft for pressing the sealing means radially against the shaft, thereby forming a static seal around the shaft, the method comprising the steps of stopping the shaft from moving, moving the pressing means axially along the shaft to press the sealing means radially against the shaft, thereby forming a static seal around the shaft, and thereafter removing the packing.

10. The method of claim 9 in which the shaft is rotatable, at least 500 feet long, and is being used in a geothermal well.

11. A method for removing the packing from a stuffing box assembly for a rotatable shaft used to drive a fluid pump, the assembly comprising:
 (a) a housing concentrically disposed around the shaft;
 (b) packing means for holding the packing against the shaft;
 (c) a resilient sealing ring having opposing ends, the ring being within said housing and concentrically disposed around the shaft, the ring comprising an axially extending main portion and a radially extending flange, the flange being at the end of the ring closer to the fluid being pumped;
 (d) retaining means for securely holding the flange against the housing so that in the absence of a radially inwardly directed force the main portion of the sealing ring is radially spaced apart from the shaft so that fluid can pass axially along the shaft and act to force the sealing ring radially away from the shaft;
 (e) a seal container secured to the housing and axially movable relative to the housing, the shaft, and the sealing ring; and
 (f) means for controllably displacing the seal container axially relative to the shaft for selectively (i) pressing the main portion of the sealing ring radially inwardly against the shaft for forming a static seal around the shaft or (ii) allowing the sealing ring to be spaced apart from the shaft,
 the method comprising the steps of stopping rotation of the shaft, displacing the container axially relative to the shaft to press the main portion of the sealing ring radially inwardly against the shaft, thereby forming a static seal around the shaft, and removing the packing.

* * * * *